(12) United States Patent
Hirakata et al.

(10) Patent No.: US 6,378,358 B1
(45) Date of Patent: Apr. 30, 2002

(54) STROKE JUDGING DEVICE FOR A 4-CYCLE ENGINE

(75) Inventors: Yoshiaki Hirakata; Masaya Adachi; Akihiko Hamazaki, all of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/578,682

(22) Filed: May 26, 2000

(30) Foreign Application Priority Data

May 28, 1999 (JP) .......................................... 11-149871

(51) Int. Cl.$^7$ ............................................. G01M 15/00
(52) U.S. Cl. ...................................................... 73/117.3
(58) Field of Search ............................... 73/116, 117.2, 73/117.3, 118.1; 340/438, 439

(56) References Cited

U.S. PATENT DOCUMENTS

| | | | | |
|---|---|---|---|---|
| 4,718,396 A | * | 1/1988 | Shimada et al. | ........... 73/117.3 |
| 4,889,094 A | * | 12/1989 | Beyer et al. | |
| 5,948,973 A | * | 9/1999 | Fujii et al. | ..................... 73/116 |
| 5,979,413 A | * | 11/1999 | Ohnuma et al. | ............... 73/116 |
| 6,041,647 A | * | 3/2000 | Matsuoka | ..................... 73/116 |
| 6,170,322 B1 | * | 1/2001 | Yamazaki et al. | ......... 73/117.3 |

FOREIGN PATENT DOCUMENTS

JP           10-227252           8/1998

* cited by examiner

*Primary Examiner*—Eric S. McCall
(74) *Attorney, Agent, or Firm*—Birch, Stewart, Kolasch & Birch

(57) ABSTRACT

A stroke judgment device includes a gear having a portion with no teeth, a pulse generator, an intake pipe internal pressure detecting device and an ECU. The ECU controls an injector(s) and the ignition timing of a spark plug(s). The ECU mainly includes a phase detecting device for detecting the phase of the crankshaft, a first stroke judging device for judging stroke based on detected phase and intake pipe internal pressure, a rotational cycle detection device for detecting rotational cycle of the crankshaft, a comparison device for comparing two rotation cycles of specified phase, a second stroke judging device for judging stroke based on results of comparison, and selection device for selecting one of the first stroke judging device or the second stroke judging device.

3 Claims, 9 Drawing Sheets

STROKE JUDGING DEVICE FOR A 4-CYCLE ENGINE

BACKGROUND OF THE INVENTION

1. Field of the Invention

The present invention relates to a stroke judging device for a 4-cycle engine, which uses an electronic fuel injection system, more particularly to a stroke judgment device for a 4-cycle engine that can accurately carry out stroke judgment even when an intake pipe internal pressure is close to atmospheric pressure (negative pressure is low).

2. Background Art

In a conventional 4-cycle engine using an electronic fuel injection system, stroke judgment is detected with both cam shaft phase and crankshaft phase of the engine. However, in Japanese Patent Publication laid-open No. Hei. 10-227252, a stroke judgment device is proposed that carries out stroke judgment not by detecting cam shaft phase, but based on an interrelationship between crankshaft phase and intake pipe internal pressure. As a result, there is no need to install a cam sensor inside the cylinder head of the engine, which enables reduction in size and weight of the engine.

The above described related art pays particular attention to regular variations in intake pipe internal pressure with two rotations of the crankshaft as one cycle, and if the engine is rotating in a steady state it is possible to judge the stroke because the state of each stroke is reflected in the intake pipe internal pressure.

However, in cases where the throttle is wide open in transient states such as when the engine is started, or in cases where the throttle is wide open in a steady state and the engine is rotating at high speed, the intake pipe internal pressure rises to the level of atmospheric pressure, regardless of the stroke. Because of this, the state of each stroke is not reflected in the intake pipe internal pressure and there is a problem that it is not possible to carry out accurate stroke judgment with only the interaction between the crankshaft phase and the intake pipe internal pressure.

SUMMARY OF THE INVENTION

An object of the present invention is to solve the above described problems with the related art, and to provide a stroke judging device for a 4-cycle engine that can accurately judge stroke even when the throttle is wide open and intake pipe internal pressure is close to atmospheric pressure (low negative pressure).

In order to achieve the above described object, the present invention provides a stroke judging device for a 4-cycle engine containing a phase detection means for detecting phase of a crankshaft of the 4-cycle engine, intake pipe internal pressure detection means for detecting pressure inside an intake pipe leading to a cylinder of the engine, and first stroke judging means for judging a stroke based on an interrelationship between detected phase of the crankshaft and detected pressure inside the intake pipe, comprising rotation cycle detection means for detecting respective rotation cycles for each phase of the crankshaft, comparing means for comparing two rotation cycles detected in different specified phases of the crankshaft, second stroke judging means for judging the stroke based on comparison results, and selection means for selecting the first or second stroke judging means.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
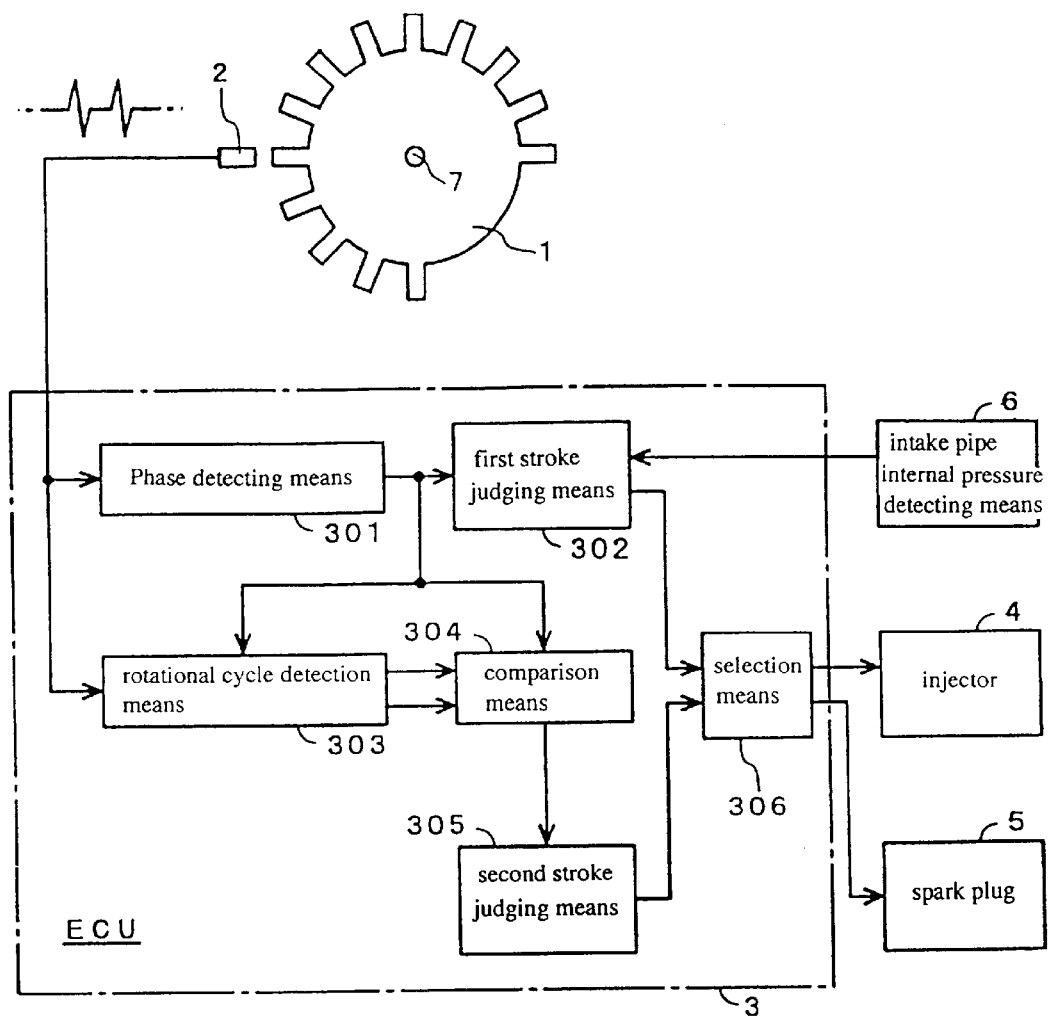
FIG. 1 is a block diagram showing the structure of main sections of a stroke judging device for a 4-cycle engine of a first embodiment of the present invention.

FIG. 1 is a block diagram of a stroke judging device for a 4-cycle engine according to a first embodiment of the present invention. The stroke judging device includes a gear 1 having a portion with no teeth, a pulse generator 2 for outputting 13 pulses in response to rotation of the gear 1 when a crankshaft 7 rotates once, an intake pipe internal pressure detecting device 6 for detecting pressure inside an intake pipe, and an ECU 3 (Electronic Control Unit) for controlling the fuel injection timing and fuel amount for an injector 4, and the ignition timing of a spark plug 5.

The ECU 3 mainly includes a phase detecting device 301 for detecting the phase of the crankshaft 7 based on a pulse signal generated by the pulse generator 2, a first stroke judging device 302 for judging stroke based on detected phase and intake pipe internal pressure, a rotational cycle detection device 303 for detecting rotational cycle ME of the crankshaft 7 for every phase based on the pulse signal, a comparison device 304 for comparing two rotation cycles detected by the rotational cycle detection means 303 at a specified phase, a second stroke judging device 305 for judging stroke based on results of comparing rotational cycle ME, and a selection device 306 for selecting one of the first stroke judging device 302 or the second stroke judging device 305 based on traveling conditions of the vehicle, and the injector 4 and the spark plug 5 are controlled by the stroke judging device selected by the selection 306.

Figure 7:
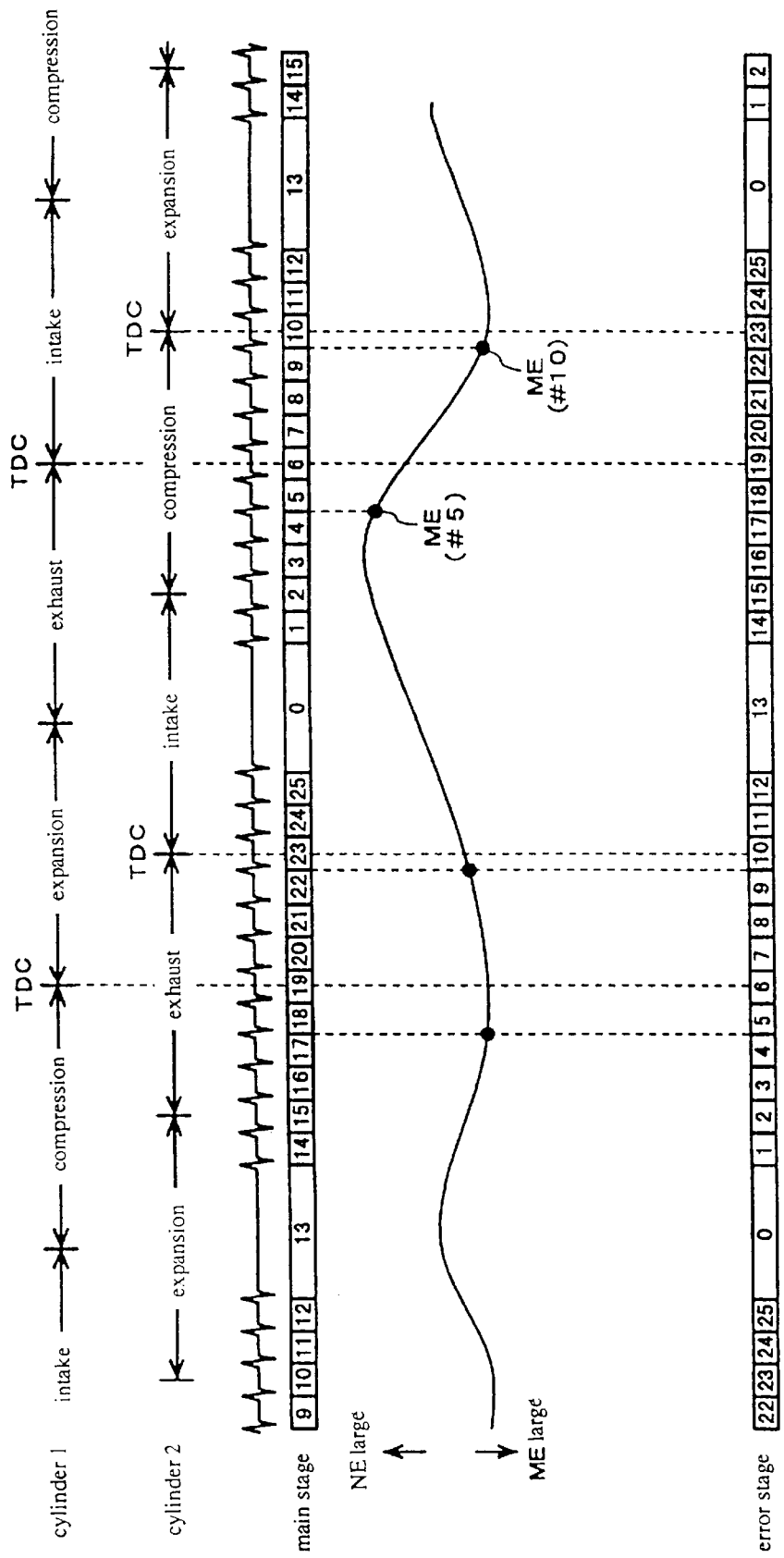
FIG. 7 is a timing chart showing the relationship between stroke and crankshaft rotation cycle ME in a V-type 4-cycle engine.

FIG. 7 is a timing chart showing the relationship between stroke and crankshaft rotation cycle ME in the V-type 4-cycle engine. In this drawing, one rotation of the crankshaft is divided into thirteen stages including a stage where there are no gear teeth, and two rotations (26 stages) of the crankshaft, being one stroke cycle, is divided into main stage numbers #0–#25.

Here, if each rotation cycle ME is compared for stage #5 and stage #10, and for stage #18 (equivalent to stage #5) and stage #23 (equivalent to stage #10), having the same phase relationship with respect to the crankshaft, ME for stage #10 exceeds ME for stage #5, and this relationship is maintained regardless of intake pipe internal pressure. Also, if stage #18 are compared, conversely to the above described case, ME for stage #18 exceeds ME for stage #23, and this relationship is also maintained regardless of intake pipe internal pressure.

Accordingly, even if the phase relationship with respect to the crankshaft is the same, if attention is paid to the phase relationship of ME there is no relationship to intake pipe internal pressure and a corresponding relationship between stage and stroke can be judged.

Next, a stroke judging process using the above described ECU 3 will be described with reference to the flow charts of FIG. 2–FIG. 6 and the timing charts of FIG. 7–FIG. 9. The example in this embodiment is a V-type 2 cylinder engine with a bank angle of 90° and a relationship between stroke and normal stage (main stage) for each of the cylinders 1 and 2 is shown n FIG. 9. Also, compression top dead center for each cylinder 1 and 2 corresponds to stage #19 and #10, and exhaust top dead center for each cylinder 1 and 2 corresponds to stage #6 and stage #23.

Figure 2:
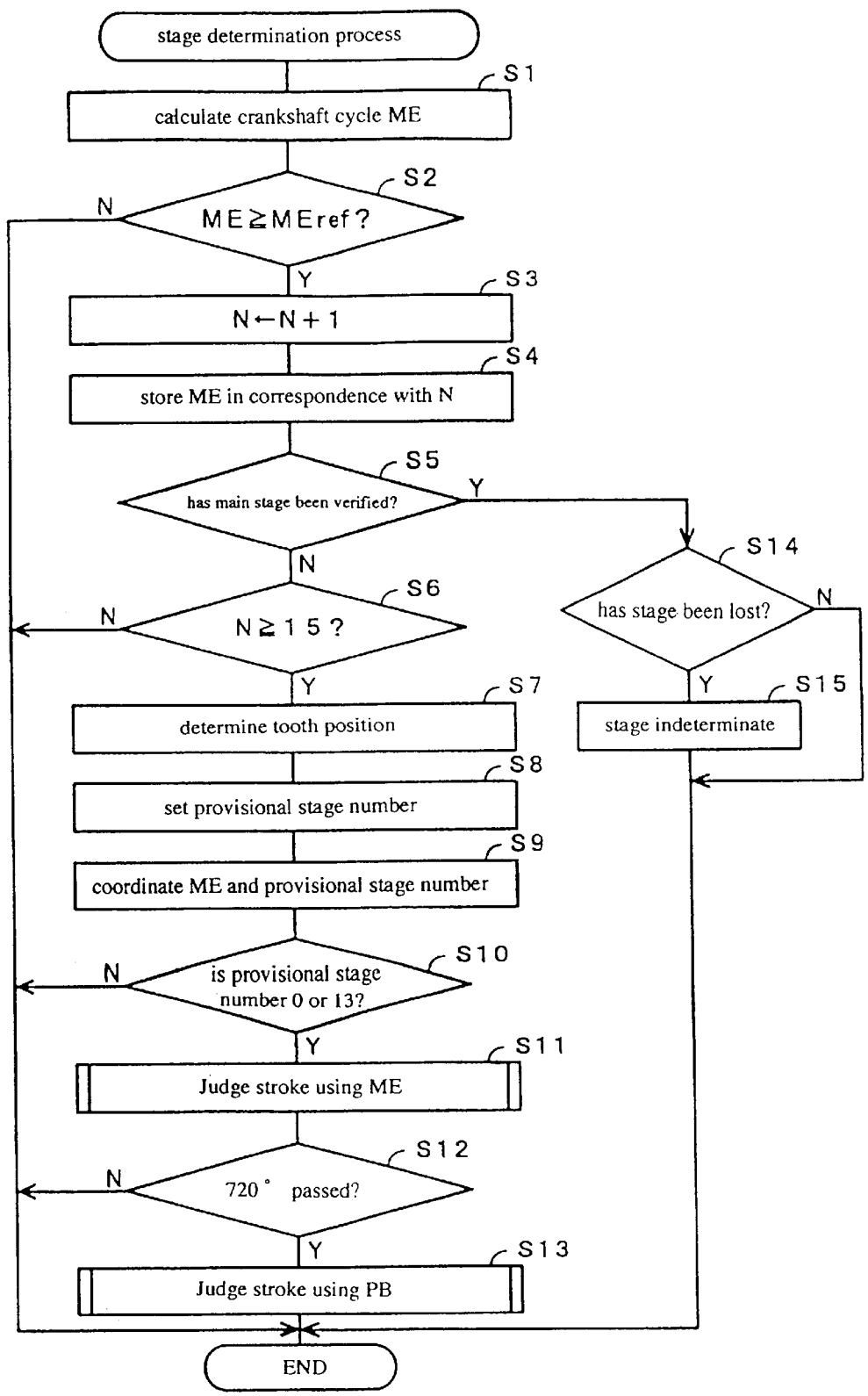
FIG. 2 is a flow chart of a "stage determination process"

If counting of the number of pulses of the gear 1 with a toothless portion is initiated by the ECU 3, a "stage judgment process" (main flow) shown in the flow chart of FIG. 2 is started. Here, "stage" is an ordinal number assigned to each section when the rotation of the crankshaft 2 is divided up at pulse intervals, and in this embodiment there are main stage numbers #0–#26 for two rotations of the crankshaft 2 (26 stages), constituting one stroke cycle.

In step S1, the rotational cycle ME [=f(Δt)] of the crankshaft 7 is obtained by the rotational cycle detection means 303 based on an elapsed time Δt from the time of the previous pulse detection to the time of pulse detection this time. In step S2, if the cycle ME is shorter than a specified time MEref, that is, if it has been detected that the rotational speed of the engine has exceeded a specified value, processing advances to step S3 where a count value N of a stage counter is incremented, and this count value N is defined as the start time stage number (#N). The stage counter reiterates stage numbers in the range 0–25. In step S4 rotational cycle calculated for each stage is coordinated with the start time stage #N and stored.

In step S5 it is judged whether or not the main stage is being defined, and here it is not yet being defined, so processing advances to step S6 to tentatively set a provisional stage prior to main stage definition. In step S6, as shown in FIG. 8, if the start time stage reaches #15, that is, if the gear with a toothless section 1 rotates more than once, processing advances to step S7 where the toothless position is detected by the phase detecting means 301. The toothless position constitutes a stage (in this embodiment "#5") equivalent to (N−1) in the case where ME (N−1)/ME(N) is calculated and this value represents a large value.

In step S8, the provisional stage number is determined based on the stage (=#5) of the toothless position. That is, as shown in FIG. 8, the provisional stage #0 is assigned to the toothless stage, and similarly, provisional stage #1 is assigned to the start time stage #6, and provisional stage #2 is assigned to start time stage #7. However, in this case it is uncertain whether the stage of the toothless position is actually equivalent to main stage #0, or equivalent to main stage #13.

In step S9, the mutual relationship between the start time stage and the rotation cycle ME is revised to a mutual relationship between the provisional stage and the cycle ME based on the mutual relationship between the toothless stage and the provisional stage. That is, the rotational cycle ME of start time stage #6 is re-registered as the rotational cycle ME of provisional stage #1.

If the provisional stage is defined, as described above, then in step S10 it is determined whether or not the current provisional stage is either #0 or #13, and if the provisional stage is anything other than #0 or #13 the appropriate process is terminated. Also, If the provisional stage is #0 or #13, in step S11 the "stroke judgment process using ME" is executed to determine the stage based on the crankshaft rotation cycle ME.

Figure 3:
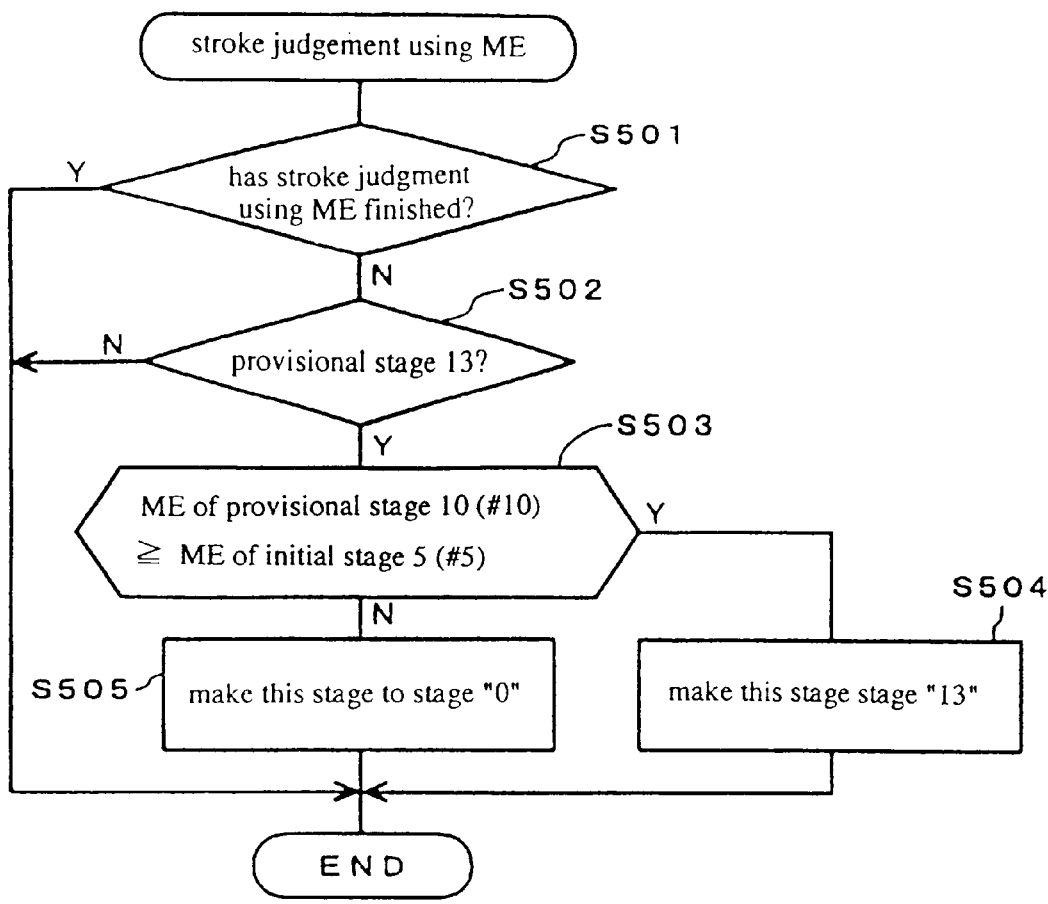
FIG. 3 is a flowchart of a "stroke judgement process using ME"

FIG. 3 is a flowchart showing processing details of the "stroke judgement process using ME". In step S501, it is determined whether or not the "stroke judgement process using ME" has already been completed, using the selection means 306, and as this is the first time, processing advances to step S502. In step S502, it is determined whether or not the current provisional stage is #13, and if it is anything other than #13 the appropriate processing is terminated, while if it is #13 processing advances to step S503. In step S503, the rotation cycle ME (#10) of provisional stage #10 and the rotation cycle ME (#5) of provisional stage #5 are compared by the comparison means 304.

If the current provisional stage matches the main stage, then as shown in FIG. 7, at provisional stage #10 cylinder 2 is at top dead center just before ignition, which means that the rotation cycle ME (#10) should be ahead of the rotation cycle ME (#5), as shown by the curved line. Conversely, if the provisional stage does not match the main stage and matches an error stage, then at provisional stage #5 cylinder 1 is close to top dead center just before ignition and so the rotation cycle ME (#5) should be ahead of the rotation cycle ME(#10).

Figure 8:
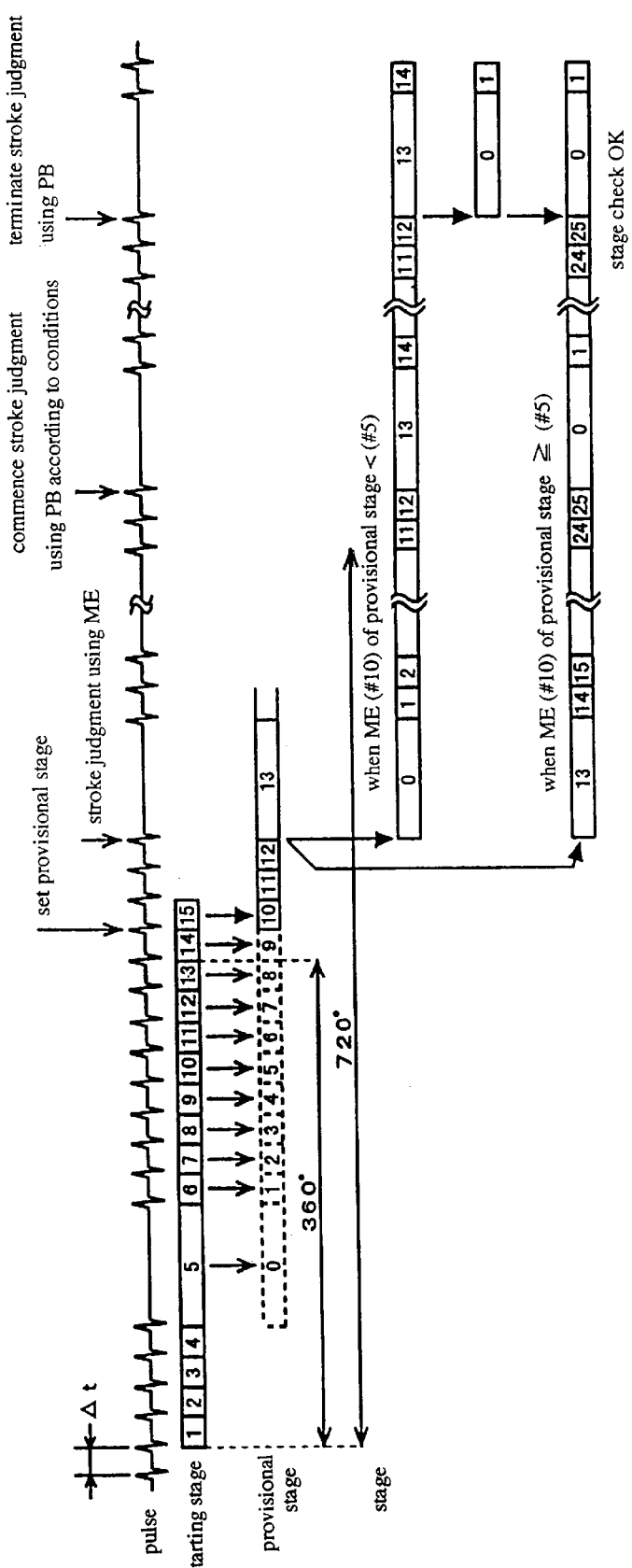
FIG. 8 is a timing chart showing the relationship between stage when starting, provisional stage and main stage.

Accordingly, if it is determined in step S503 that cycle ME (#10)≧cycle ME (#5), then in step S504, as shown in FIG. 8, the current stage (provisional stage #13) is set to main stage #13 by the second stroke judging means 305, while if cycle ME (#10)≦cycle ME (#5) the current stage is set to main stage #0 in step S505.

In this way, with this embodiment, paying attention to the fact that the crankshaft 7 rotation cycle ME varies regularly in response to engine stroke, engine stroke judgement is carried out based on the interrelationship between phase of the crankshaft 7 and the rotation cycle ME, which means that stroke judgement can be carried out accurately regardless of intake pipe internal pressure.

Also with this embodiment, since "stroke judgement processing using ME" is executed immediately after startup of the engine until the crankshaft 7 reaches a specified rotational speed, particularly, even in the event that variations in the intake pipe internal pressure in each stroke are small due to the fact that the accelerator is wide open or starting is being carried out, it is possible to carry out accurate stroke judgement.

Returning to FIG. 2, if "stroke judgement processing using ME" is completed, as described in the above, then in step S12 it is determined by the selection means 306 whether or not the crankshaft has rotated through at least 720° since startup of the engine; and if the crank shaft has not rotated through 720°, processing is terminated. On the other hand, if the crank shaft has rotated by at least 720°, it is judged that engine running has reached a steady state and processing advances to step S13. In step S13, "stroke judgment processing using PB" is executed to determine the stage based on the intake pipe internal pressure PB.

Figure 4:
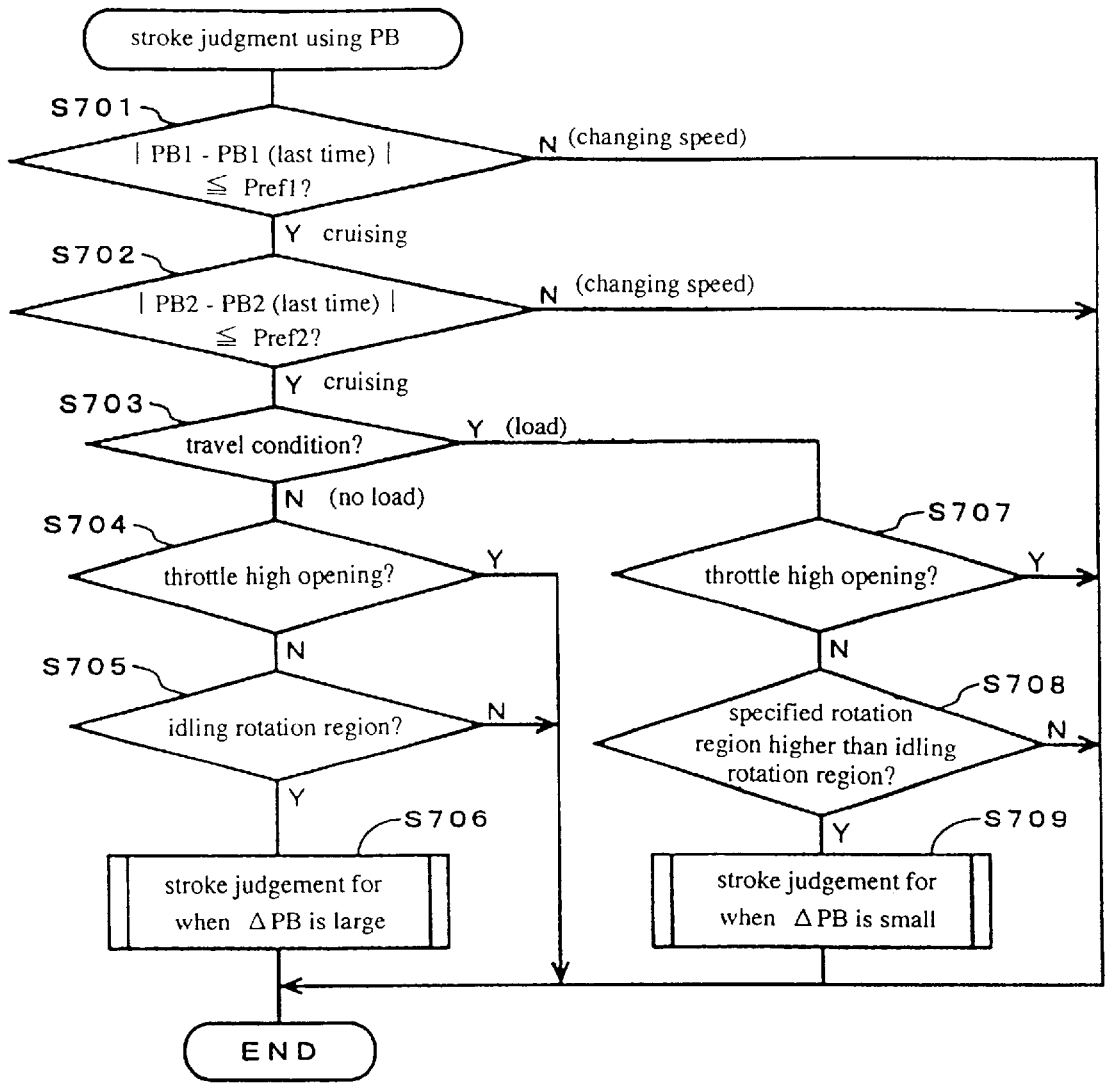
FIG. 4 is a flowchart of a "stroke judgement process using PB"

FIG. 4 is a flowchart specifically showing processing details of the "stroke judgement process using PB." Intake pipe internal pressure PB1, which will be described later, is the pressure of a specified stage where an assumed value becomes high, while intake pipe internal pressure PB2 is pressure of a specified stage within ±360° from the detected position of PB1. In this embodiment, as shown in FIG. 9, the intake pipe internal pressure PB1 and PB2 are treated as intake pipe internal pressures to be detected respectively in main stage #25 and #12.

In step S701, the first stroke judgment means 302 compares an absolute value of a difference [PB1–PB1 (last time)] between the PB1 at this time and the previous PB1 (720° before) (last time) and a specified value Pref1. If the difference exceeds the specified value, Pref1 it is judged that the vehicle is in a variable speed state and that it would be inappropriate to carry out stroke judgment based on intake pipe internal pressure and the appropriate processing is terminated. On the other hand, if the difference is less than or equal to the specified value Pref1, then an absolute value of a difference [PB2–PB2(last time)] between the PB2 at this time and the previous PB2 (720° before) is compared with a specified value Pref2 in step S702. Here also, if the difference exceeds the specified value Pref 2 it is judged that the vehicle is accelerating or decelerating and that it would be inappropriate to carry out stroke judgment based on intake pipe internal pressure and the appropriate processing is terminated, while if the difference is less than or equal to the specified value Pref2 it is judged that the vehicle is cruising and processing advances to step S703.

In this way, with this embodiment stroke judgment is skipped under conditions where fluctuations in intake pipe internal pressure PB are large and stroke judgment based on PB becomes inaccurate, which means that it is possible to take precautions to prevent erroneous stroke judgment.

In step S703, whether or not the vehicle is moving is determined, for example, based on whether or not the gear shift is in the neutral position. Here, if it is judged that the vehicle is not traveling, the throttle opening amount is detected in step S704, and if the throttle opening amount is large it is determined that air will be rushing in and appropriate processing terminates. On the other hand, if the throttle opening amount is small, processing advances to step S705. In step S705, it is determined whether or not the rotational speed of the engine is in the idling region, and if it is in the idling region, "stroke judgement processing for when ΔPB is large," which will be described later, is executed in step S706.

On the other hand, if it is determined in step S703 that the vehicle is moving, the throttle opening amount is detected in step S707, and if the throttle opening amount is high it is determined that the vehicle is climbing, for example, and the appropriate processing terminates. If the throttle opening is low, processing advances to step S708. In step S708, it is determined whether or not the rotational speed of the engine is in a specified region slightly higher than the idling region, and if it is in the specified region it is determined that engine braking is in progress, due to overrun or descending. "Stroke judgement processing for when APB is small", which will described later, is then executed in step S709.

Figure 5:
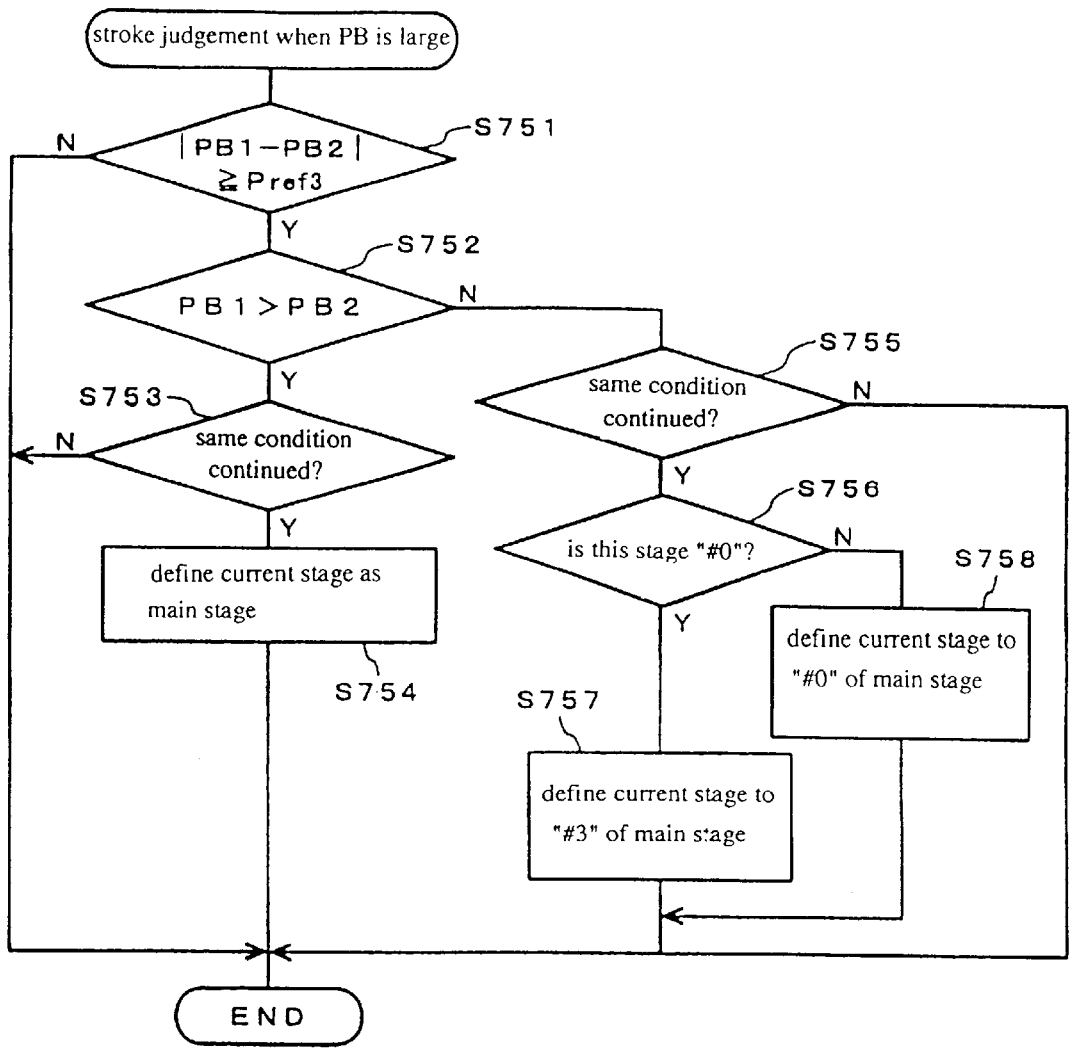
FIG. 5 is a flow chart of a "stroke judgment process when $\Delta PB$ is large"

Next, referring to the flow chart of FIG. 5, the above mentioned "stroke judgement processing for when APB is large" will be described in detail.

In step S751, an absolute value of a difference [PB1–PB2] between PB1 and PB2 is compared with a specified value Pref3, and if the difference is less than the specified value Pref3 the appropriate processing terminates. If the difference is greater than or equal to the specified value Pref3 the size relationship of PB1 and PB2 is compared in step S752.

Accordingly, with this embodiment, stroke judgment processing based on fluctuations in intake pipe internal pressure is carried out only when the vehicle is traveling at a constant speed, which means that it is possible to set this threshold value Pref3 small and carry out reliable detection even if there are microscopic fluctuations in intake pipe internal pressure.

Figure 9:
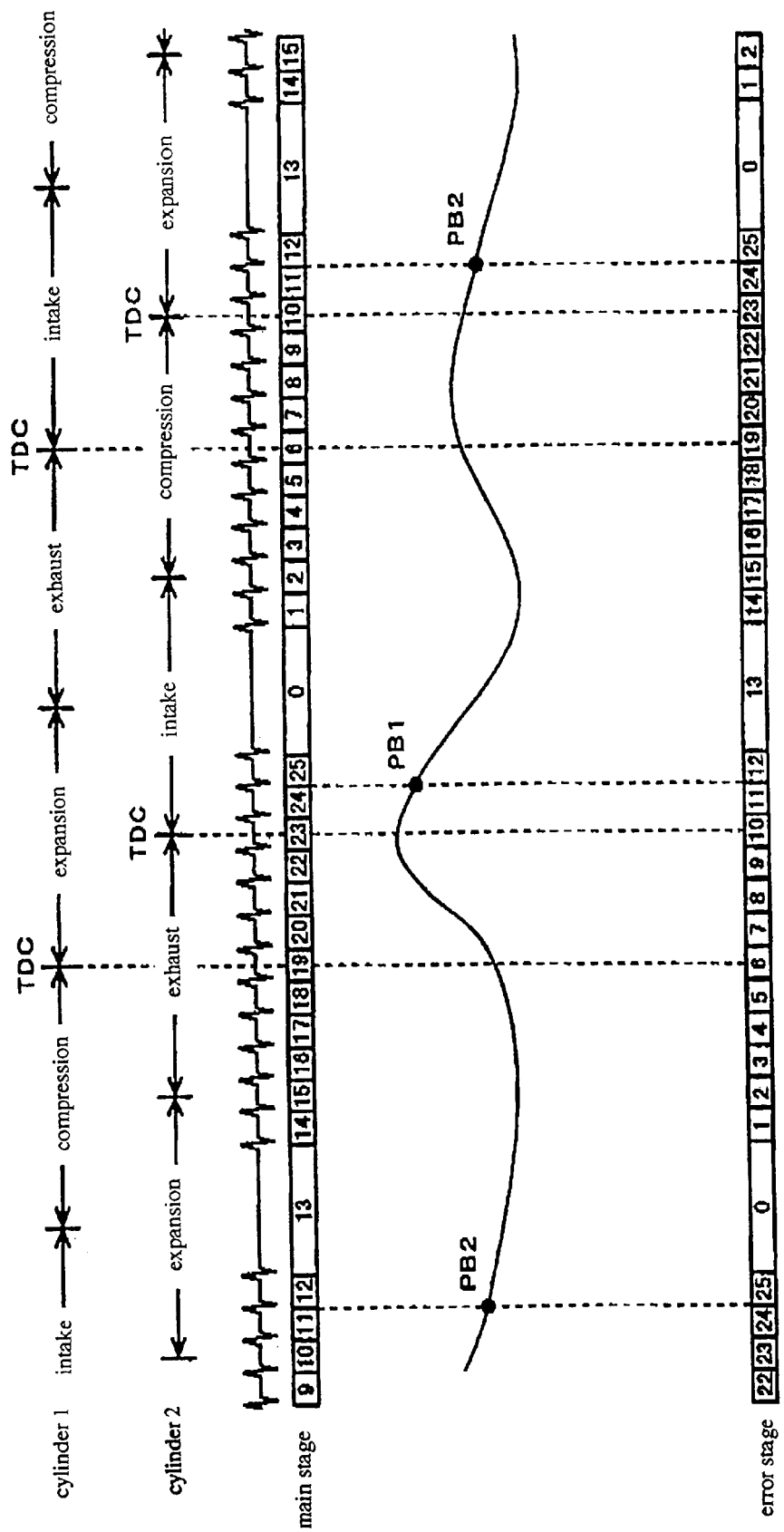
FIG. 9 is a timing chart showing the relationship between stroke and intake pipe internal pressure PB for a V-type 4-cycle engine.

Here, if PB1 and PB2 are respectively detected in normal stages #25 and #12, then the relationship should be that PB1>PB2, as shown in FIG. 9. Accordingly, in the previously described step S752, it is determined that PB1>PB2, and in step S753 if it is determined that the same condition has been detected continuously a specified, number of times then in step S754 the current provisional stage is defined as it is as the main stage.

On the other hand, if it is found in step S752 that the relationship is not PB1 PB2, if it is detected in step S755 that the same condition is detected continuously a specified number of times, the current provisional stage number is determined in step S756. Here, if the provisional stage number is #0, the current stage is reset to main stage #13 in step S757. Also, if the current provisional stage number is anything other than #0 the current stage is reset to main stage #0 in step S758.

Figure 6:
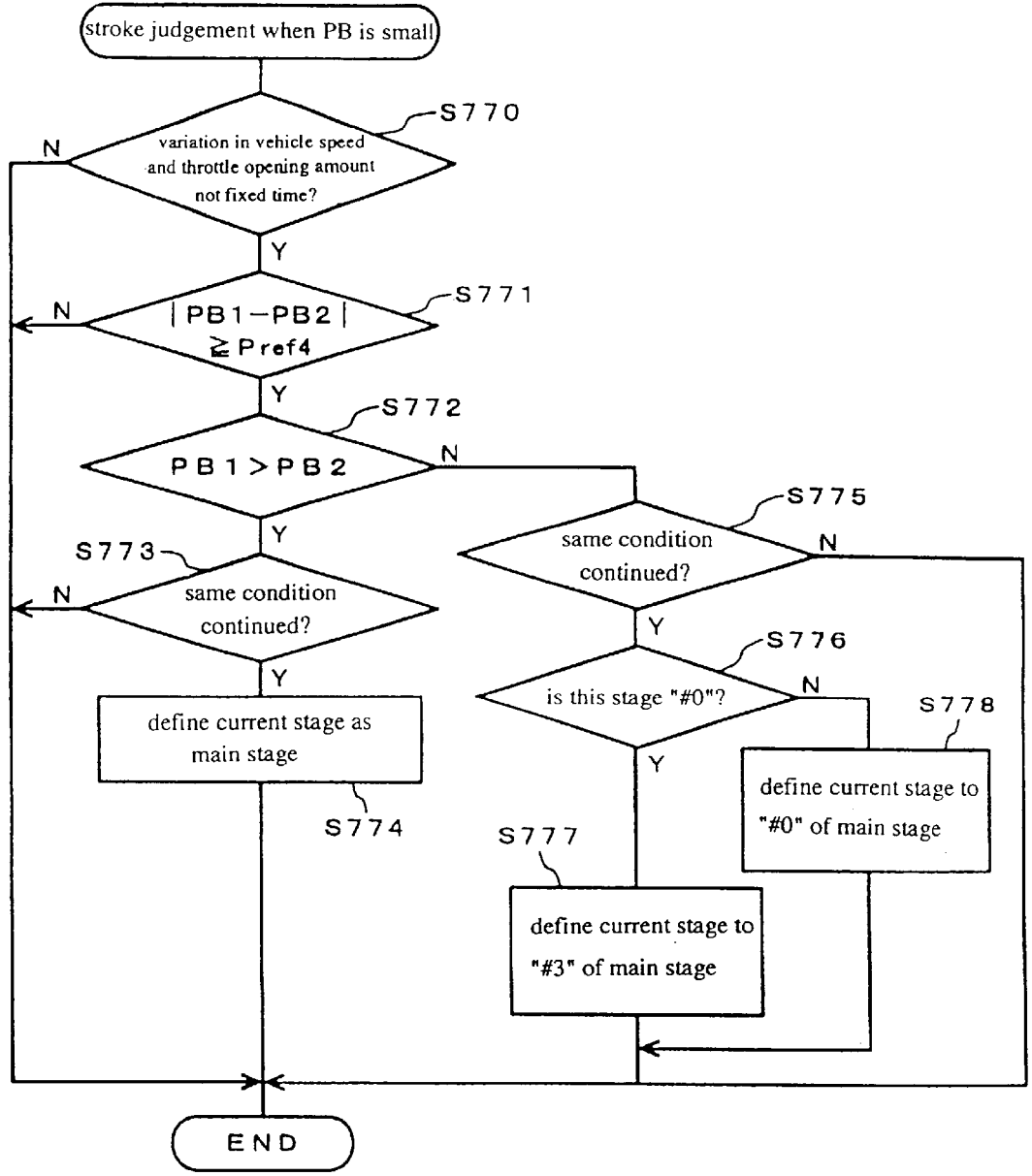
FIG. 6 is a flowchart of a "stroke judgment process when $\Delta PB$ is small"

Next, the "stroke judgement processing for when ΔPB is small" will be described in detail with reference to FIG. 6.

In step S770, the vehicle speed and throttle opening conditions are referred to, and if either condition is in a specified range, with substantially no variation it is determined that speed is constant and processing advances to step S771. In step S771, an absolute value of a difference [PB1–PB2] between PB1 and PB2 is compared with a specified value Pref4 (<Pref3), and if the difference is less than the specified value Pref4 processing is terminated.

Therefore, with this embodiment, whether or not stroke judgment is carried out based on intake pipe internal pressure is determined based on results of comparison between an absolute value of a difference between intake pipe internal pressures PB1 and PB2 and specified reference values, and in this case since the reference value can be varied in response to the traveling load of the vehicle (step S703), stroke judgment can always be carried out accurately regardless of the traveling load of the vehicle.

Here, if the difference is larger than the specified value Pref4, the size relationship of PB1 and PB2 is compared in step S772. If PB1 and PB2 are respectively detected in normal stages #25 and #12, then the relationship should be that PB1>PB2, as described above. Accordingly, if it is determined in step S772 that PB1>PB2 and determined in step S773 that this condition has been continuously detected a specified number of times, then the current provisional.

On the other hand, if it is found in step S772 that the relationship is not PB1>PB2, if it is detected in step S775 that the same condition is detected continuously a specified number of times, the current provisional stage number is determined in step S776. Here, if the provisional stage number is #0, the current stage is reset to main stage #13 in step S777, while if the current provisional stage number is anything other than #0, the current stage is reset to main stage #0 in step S778.

Returning To FIG. 2, if the main stage is defined as a result of the above described processing, processing then flows from Step S5 to S14. In step S14 it is determined whether or not the main stage has been lost, and as long as the main stage has not been lost the processing of steps S1 . . . S5, S14 and S1 are repeated.

After that, if the main stage is lost for any reason, indication that the stage is indefinite, such as a true flag etc, is registered in step S15 and in the subsequent step SS it is determined that the stage is indefinite and processing advances to step S6 and after and each of the above processes are repeated. However, with the "stroke judgement processing using ME", since it is judged in step S501 that "stroke judgement processing using ME" has already been terminated stroke judgement processing using ME is not performed and only stroke judgment based on intake pipe internal pressure is carried out.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A stroke judging device for a 4-cycle engine, comprising:
   a phase detection means for detecting phase of a crankshaft of the 4-cycle engine;
   intake pipe internal pressure detection means for detecting pressure inside an intake pipe leading to a cylinder of the engine;
   first stroke judging means for judging a stroke based on an interrelationship between detected phase of the crankshaft and detected pressure inside the intake pipe at or above a specified crankshaft rotational speed;
   rotation cycle detection means for detecting respective rotation cycles for each phase of the crankshaft;
   comparing means for comparing two rotation cycles detected in different specified phases of the crankshaft;
   second stroke judging means for judging the stroke based on comparison results at or below the specified crankshaft rotational speed; and
   selection means for selecting the first or second stroke judging means depending upon the crankshaft rotational speed.

2. The stroke judging device for a 4-cycle engine as set forth in claim 1, wherein the intake pipe internal pressure detection means is further capable of obtaining an absolute value of a difference between a first intake pipe internal pressure for a specified crankshaft angle (n) and a second intake pipe internal pressure for an angle (n−720°), and the intake pipe internal pressure detection means is also capable of detecting a third intake pipe internal pressure for a specified angle within ±360° of the specified angle (n), and the first stroke judging means carries out stroke judgement based on an interaction between the first and second intake pipe internal pressures and the third intake pipe internal pressure when the absolute value is equal to or less than a specified value, and does not carry out stroke judgment if the absolute value exceeds the specified value.

3. A stroke judging device for a 4-cycle engine, comprising:
   phase detection means for detecting phase of a crankshaft of the 4-cycle engine;
   intake pipe internal pressure detection means for detecting pressure inside an intake pipe leading to a cylinder of the engine;
   first stroke judging means for judging a stroke based on an interrelationship between detected phase of the crankshaft and detected intake pipe internal pressure, wherein the intake pipe internal pressure detection means is capable of obtaining an absolute value of a difference between a first intake pipe internal pressure for a specified crankshaft angle (n) and a second intake pipe internal pressure for a second crankshaft angle (n−720°), and the intake pipe internal pressure detection means is further capable of detecting a third intake pipe internal pressure for another specified angle within ±360° of the specified angle (n), and the first stroke judging means carries out stroke judgment based on an interaction between the first and second intake pipe internal pressures and the third intake pipe internal pressure when the absolute value is equal to or less than a specified value, and does not carry out stroke judgment if the absolute value exceeds the specified value; and
   means for detecting a traveling load of the engine, wherein the first stroke judgment means carries out stroke judgement based on an interaction between the first, second and third intake pipe internal pressures when a second absolute value is equal to or more than a second specified value, said second absolute value being of a difference between the first and second intake pipe internal pressures and the third intake pipe internal pressure and using the second specified value as a function of traveling load of the engine without carrying out stroke judgment when the second absolute value is less than the second specified value.

* * * * *